(12) United States Patent
Lee

(10) Patent No.: US 9,007,203 B2
(45) Date of Patent: Apr. 14, 2015

(54) INFORMING SYSTEM FOR ELECTRONIC ANKLET INFORMATION AND THE METHOD OF USING THE SAME THEREOF

(71) Applicant: Gunsoo Lee, Yongin-si (KR)

(72) Inventor: Gunsoo Lee, Yongin-si (KR)

( * ) Notice: Subject to any disclaimer, the term of this patent is extended or adjusted under 35 U.S.C. 154(b) by 36 days.

(21) Appl. No.: 14/025,975

(22) Filed: Sep. 13, 2013

(65) Prior Publication Data

US 2014/0077947 A1 Mar. 20, 2014

(30) Foreign Application Priority Data

Sep. 17, 2012 (KR) ........................ 10-2012-0102600

(51) Int. Cl.
| | | |
|---|---|---|
| G08B 21/02 | (2006.01) | |
| H04W 4/02 | (2009.01) | |
| H04W 4/22 | (2009.01) | |
| G06F 9/44 | (2006.01) | |
| G06F 3/048 | (2013.01) | |
| H04M 1/00 | (2006.01) | |
| G08B 21/22 | (2006.01) | |
| G06Q 10/00 | (2012.01) | |
| H04M 1/725 | (2006.01) | |
| H04L 29/08 | (2006.01) | |
| H04W 4/00 | (2009.01) | |

(52) U.S. Cl.
CPC ............... *G08B 21/02* (2013.01); *H04W 4/02* (2013.01); *H04W 4/22* (2013.01); *G06F 8/00* (2013.01); *G06F 3/048* (2013.01); *H04M 1/00* (2013.01); *H04W 4/023* (2013.01); *G08B 21/22* (2013.01); *G06Q 10/00* (2013.01); *H04M 1/72541* (2013.01); *H04L 67/34* (2013.01); *H04W 4/001* (2013.01); *H04W 4/028* (2013.01)

(58) Field of Classification Search
USPC .......... 340/539.13, 573.4, 505, 539.15, 573.1, 340/6.1, 8.1
See application file for complete search history.

(56) References Cited

U.S. PATENT DOCUMENTS

| | | | |
|---|---|---|---|
| 2007/0139207 A1* | 6/2007 | Agapi et al. ............... | 340/573.4 |
| 2008/0316023 A1* | 12/2008 | Crowl et al. ............. | 340/539.13 |
| 2010/0066545 A1 | 3/2010 | Ghazanan | |
| 2013/0328678 A1* | 12/2013 | Shechter et al. ......... | 340/539.13 |

FOREIGN PATENT DOCUMENTS

| | | |
|---|---|---|
| KR | 10-2009-0019606 A | 2/2009 |
| KR | 10-2012-0029538 A | 3/2012 |
| KR | 10-2012-0033444 A | 4/2012 |

* cited by examiner

*Primary Examiner* — Toan N Pham
(74) *Attorney, Agent, or Firm* — Revolution IP, PLLC

(57) ABSTRACT

Disclosed are a system for notifying electronic anklet information to prevent sexual violence by searching information regarding a person wearing an electronic anklet using an application on a smartphone whether the person is located within a predetermined radius from a user and by notifying the existence of the electronic anklet wearer within a predetermined range using an alarm, vibration, or a text message, and a method thereof. When the electronic anklet is within a reference distance, a text message may be displayed on a smartphone, vibration may be generated, an alarm may be output, an electronic anklet wearer located within a predetermined radius from the user may be searched for, and the user may immediately ask for help at a risk of sexual violence using an application installed in the smartphone.

3 Claims, 2 Drawing Sheets

INFORMING SYSTEM FOR ELECTRONIC ANKLET INFORMATION AND THE METHOD OF USING THE SAME THEREOF

CROSS REFERENCE TO PRIOR APPLICATIONS

This application claims priority under 35 U.S.C. §119 to Korean Patent Application No. 10-2012-0102600, filed on Sep. 17, 2012, which is hereby incorporated by reference in its entirety.

BACKGROUND OF THE INVENTION

1. Field of the Invention

The present invention relates to a system for notifying electronic anklet information, and more particularly, to a system for notifying electronic anklet information to prevent sexual violence by searching information regarding a person wearing an electronic anklet using an application on a smartphone whether the person is located within a predetermined radius from a user and by notifying the existence of the electronic anklet wearer within a predetermined range using an alarm, vibration, or a text message, and a method thereof.

2. Description of the Related Art

We are often told to hate the sin, but love the sinner. Unfortunately, however, offenders have a high rate of recidivism compared to ordinary people. Particularly, sex offenders have a very high rate of recidivism. Thus, continuous surveillance of offenders with a high likelihood of committing a crime may reduce a crime rate, and a location of a suspected person may also be rapidly detected in similar cases. However, since manpower of the police and intelligence agencies are not sufficient to monitor all potential criminals, it is impossible to conduct perfect surveillance thereon. Owing to development of techniques, a specific person may be easily and efficiently monitored using electronic devices. An electronic anklet (ankle monitor) is a device that is worn around an ankle of a person with a high likelihood of committing a crime and sends location information. The electronic ankle may be a new type of shackle created in combination with information technology. The electronic anklet includes three components of a tether applied to an ankle, a portable global positioning system (GPS), and a house-arrest monitoring device. An electronic anklet wearer must carry the portable GPS. Information regarding locations or routes of domestic sexual offenders are transmitted to and recorded in a central monitoring center of the Ministry of Justice by a GPS transmitter in real-time all day.

SUMMARY OF THE INVENTION

Conventionally, electronic anklet wearers have been monitored by the Ministry of Justice all day. However, it is difficult to prevent recidivism even though locations of the electronic anklet wearers are known. Sex offenders have a very high rate of recidivism although they are wearing electronic anklets. Thus, in recent years, concerns about preventing recidivism are drawing attention.

Therefore, the present invention has been made in view of the above problems, and it is an object of the present invention to provide a system for notifying electronic anklet information in which a user installs an application on a smartphone, searches the location of an electronic anklet wearer using this application, and notifies the user of approach of the electronic anklet wearer using an alarm, a text message, and vibration, and a method thereof.

In accordance with the present invention, the above and other objects can be accomplished by the provision of a system for notifying electronic anklet information including an electronic anklet worn by an electronic anklet wearer, a smartphone for searching approach of the electronic anklet using an application installed in advance and receiving a notice regarding the approach, an application server to provide the application for searching the approach of the electronic anklet and receiving the notice regarding the approach upon request by the smartphone, a central monitoring server for conducting surveillance on and monitoring of a current location of the electronic anklet all day, and a communications network connecting the electronic anklet, the smartphone, the application server, and the central monitoring server and allowing communications therebetween. The application is software installed on the smartphone displaying a text message on the smartphone, generating vibration, or outputting an alarm when the electronic anklet is within a reference distance.

In accordance with an aspect of the present invention, the above and other objects can be accomplished by the provision of a method of notifying electronic anklet information. The method includes installing an application by downloading the application onto a smartphone of a user from an application server, installing the downloaded application on the smartphone, executing the application, and setting reference distances including a maximum distance, a middle distance, and a close distance in three stages, outputting an alert message by displaying an alert message including "there is an electronic anklet wearer nearby" on a screen of the smartphone when the electronic anklet wearer is within the maximum distance set by the user, outputting an alarm by simultaneously outputting a pre-stored alarm and displaying an alert message including "there is an electronic anklet wearer nearby" on the screen of the smartphone when the electronic anklet wearer is within the middle distance set by the user, generating vibration by simultaneously generating vibration and displaying an alert message including "there is an electronic anklet wearer nearby" on the screen of the smartphone when the electronic anklet wearer is within the close distance set by the user since the alarm is dangerous to the user due to recognition by the electronic anklet wearer, determining whether the user presses a search button of the application disposed on the smartphone, and searching for a current location of the electronic anklet wearer by displaying the electronic anklet wearer positioned within a predetermined radius from a current location of the smartphone user when the search button is pressed.

The method may further include asking for help by installing an SOS button on the application for preventing a risk of sexual violence from the electronic anklet wearer and transmitting a current location of the smartphone user, a pre-recorded voice message asking for help, and an SOS message pre-stored in the smartphone to a central monitoring server when the user presses the SOS button.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, the present invention will be described more fully with reference to the accompanying drawings, in which exemplary embodiments of the invention are shown.

Figure 1:
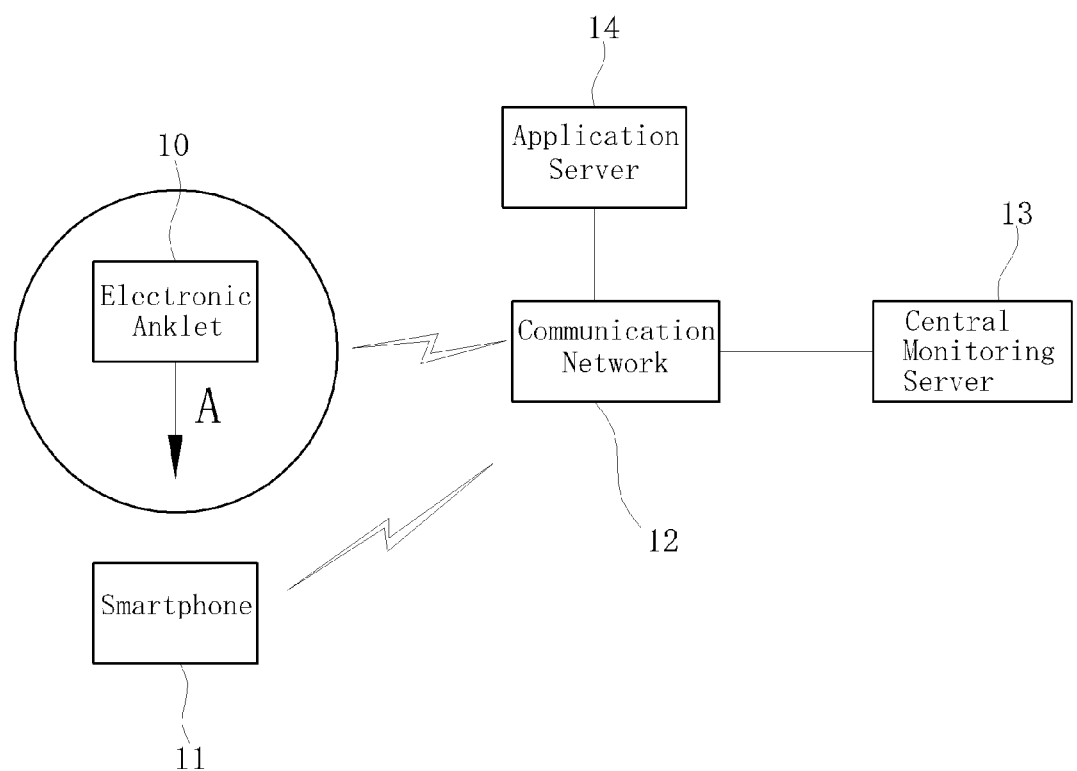
FIG. 1 is a block diagram illustrating a system for notifying electronic anklet information according to the present invention.
Figure 2:
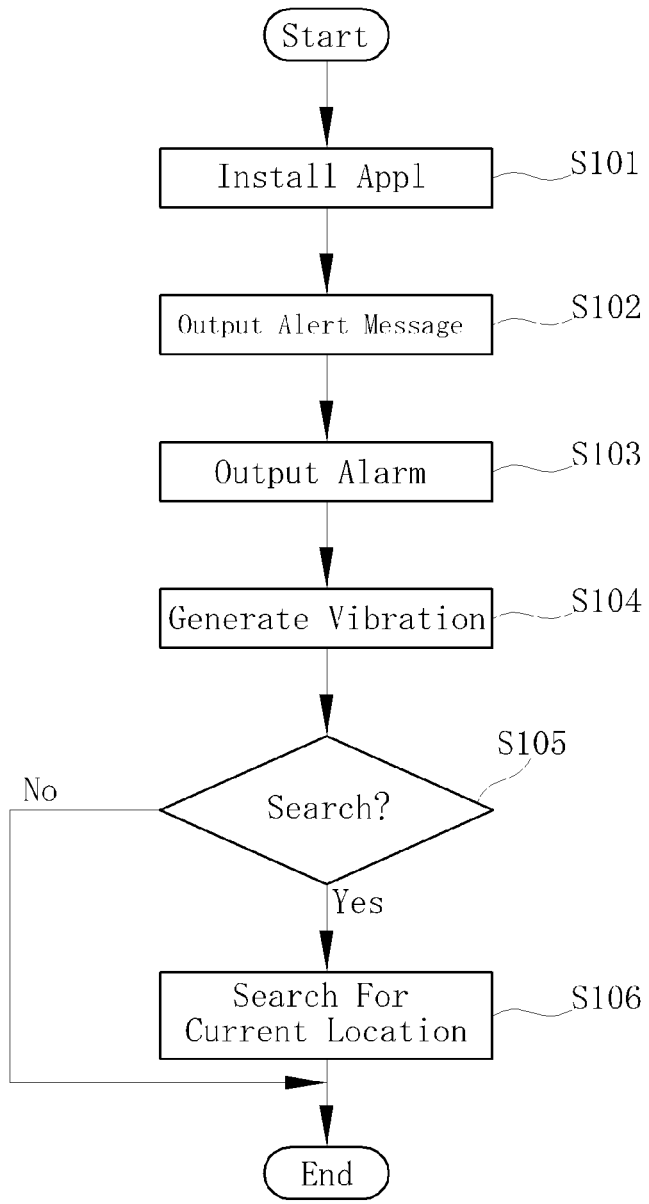
FIG. 2 is a flowchart illustrating a method of notifying electronic anklet information according to the present invention.

FIG. 1 is a block diagram illustrating a system for notifying electronic anklet information according to the present invention. FIG. 2 is a flowchart illustrating a method of notifying electronic anklet information according to the present invention.

For reference, although the notification system according to the present invention is a technically complex system using mobile communication, satellite communication, wired communication, and Internet protocol communication, such configuration may also be implemented using known techniques. For clarity of description, the present invention will be described based on novel features thereof.

Referring to FIG. 1, the system includes an electronic anklet 10 worn by an electronic anklet wearer and a smartphone 11 for searching approach of the electronic anklet using a pre-installed application and receiving a notice regarding the approach. The system also includes an application server 14 to provide the application (appl.) for searching the approach of the electronic anklet wearer and receiving the notice regarding the approach upon request by the smartphone 11. The application server 14 is a server from which a smartphone application is downloaded, for example, Android Market and Apple's App Store.

The system further includes a central monitoring server 13 that conducts surveillance on and monitoring of a current location of the electronic anklet 10 all day. The electronic anklet 10, the smartphone 11, the application server 14, and the central monitoring server 13 are connected via a communications network 12. The communications network 12 includes a mobile communication system, a satellite communication system, a wired communication system, and an Internet protocol communication system.

In this regard, the application, which is software installed on the smartphone 11, displays a text message on the smartphone 11, generates vibration, or outputs an alarm when the electronic anklet 10 is within a reference distance A.

Average times for smartphone users to perceive the text message, the vibration, and the alarm vary. That is, the text message may be used in the early stage of notification since average times for smartphone users to perceive the text message is longer than those to perceive the vibration or the alarm.

However, the user may feel uncomfortable with the alarm when the electronic anklet wearer recognizes the alarm in a very close location, and the alarm may psychologically stimulate the electronic anklet wearer. Thus, when the electronic anklet wearer is located close to the user, vibration may be safer than the alarm.

Accordingly, the notification may vary according to the distance from the electronic anklet wearer. For example, the user may be notified using the text message in the early stage of the approach of the electronic anklet wearer within a reference distance, using the alarm when the electronic anklet wearer is closer, and using the vibration when the electronic anklet wearer is much closer.

A method of notifying electronic anklet information will be described in detail with reference to FIG. 2.

The smartphone user installs an application by downloading the application onto a smartphone 11 of a user from an application server 14, installing the downloaded application on the smartphone 11, executing the application, and setting reference distances (S101).

Here, the reference distances are set in three stages, for example, a maximum distance, a middle distance, and a close distance are input. Since users have different lifestyles, the users may input the reference distances according to their lifestyle patterns. This application is available only when the three stages of inputting the reference distances are input.

Then, an alert message is output by displaying an alert message such as "there is an electronic anklet wearer nearby" on a screen of the smartphone when the electronic anklet wearer is within the maximum distance set by the user (S102).

Then, an alarm is output by simultaneously outputting a pre-stored alarm and displaying an alert message such as "there is an electronic anklet wearer nearby" on a screen of the smartphone when the electronic anklet wearer is within the middle distance set by the user (S103).

However, the alarm may be dangerous to the user due to recognition by the electronic anklet wearer when the electronic anklet wearer is within the close distance set by the user. Thus, vibration is generated by simultaneously generating vibration and displaying an alert message such as "there is an electronic anklet wearer nearby" on a screen of the smartphone (S104).

At this point, the smartphone user may be concerned about the location of the electronic anklet wearer and the number of the electronic anklet wearers nearby. To this end, the application may have a search button to search the electronic anklet wearers nearby.

That is, the application determines whether the smartphone user presses a search button (S105). When the search button is pressed, a current location of the electronic anklet wearer is searched for by displaying the electronic anklet wearer positioned within a predetermined radius from a current location of the smartphone user (S106).

Meanwhile, the application may further include an SOS button for preventing a risk of sexual violence from the electronic anklet wearer. When the smartphone user presses the SOS button, a current location of the smartphone user, a pre-recorded voice message asking for help, and an SOS message pre-stored in the smartphone are transmitted to a central monitoring server. Accordingly, sexual violence may be prevented.

As is apparent from the above description, sexual violence that may be caused by an electronic anklet wearer may be prevented without special attention and efforts. Since the current location of the smartphone user and the voice message asking for help may be transmitted to the central monitoring server by one click of the SOS button, sexual violence may be inhibited.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for notifying electronic anklet information comprising:
   an electronic anklet worn by an electronic anklet wearer;
   a smartphone for searching approach of the electronic anklet using an application installed in advance and receiving a notice regarding the approach;

an application server to provide the application for searching the approach of the electronic anklet and receiving the notice regarding the approach upon request by the smartphone;

a central monitoring server for conducting surveillance on and monitoring of a current location of the electronic anklet all day; and a communications network connecting the electronic anklet, the smartphone, the application server, and the central monitoring server and allowing communications therebetween, wherein the application is software installed on the smartphone displaying a text message on the smartphone, generating vibration, or outputting an alarm when the electronic anklet is within a reference distance.

2. A method of notifying electronic anklet information, the method comprising:

installing an application by downloading the application onto a smartphone of a user from an application server, installing the downloaded application on the smartphone, executing the application, and setting reference distances comprising a maximum distance, a middle distance, and a close distance in three stages;

outputting an alert message by displaying an alert message comprising "there is an electronic anklet wearer nearby" on a screen of the smartphone when the electronic anklet wearer is within the maximum distance set by the user;

outputting an alarm by simultaneously outputting a pre-stored alarm and displaying an alert message comprising "there is an electronic anklet wearer nearby" on the screen of the smartphone when the electronic anklet wearer is within the middle distance set by the user;

generating vibration by simultaneously generating vibration and displaying an alert message comprising "there is an electronic anklet wearer nearby" on the screen of the smartphone when the electronic anklet wearer is within the close distance set by the user since the alarm is dangerous to the user due to recognition by the electronic anklet wearer;

determining whether the user presses a search button of the application disposed on the smartphone; and searching for a current location of the electronic anklet wearer by displaying the electronic anklet wearer positioned within a predetermined radius from a current location of the smartphone user when the search button is pressed.

3. The method according to claim 2, further comprising asking for help by installing an SOS button on the application for preventing a risk of sexual violence from the electronic anklet wearer and transmitting a current location of the smartphone user, a pre-recorded voice message asking for help, and an SOS message pre-stored in the smartphone to a central monitoring server when the user presses the SOS button.

* * * * *